(12) United States Patent
Lin et al.

(10) Patent No.: US 10,839,575 B2
(45) Date of Patent: Nov. 17, 2020

(54) USER-GUIDED IMAGE COMPLETION WITH IMAGE COMPLETION NEURAL NETWORKS

(71) Applicant: Adobe Inc., San Jose, CA (US)

(72) Inventors: Zhe Lin, Fremont, CA (US); Xin Lu, Mountain View, CA (US); Xiaohui Shen, San Jose, CA (US); Jimei Yang, Mountain View, CA (US); Jiahui Yu, Champaign, IL (US)

(73) Assignee: ADOBE INC., San Jose, CA (US)

( * ) Notice: Subject to any disclaimer, the term of this patent is extended or adjusted under 35 U.S.C. 154(b) by 293 days.

(21) Appl. No.: 15/921,998

(22) Filed: Mar. 15, 2018

(65) Prior Publication Data
US 2019/0287283 A1 Sep. 19, 2019

(51) Int. Cl.
*G06K 9/00* (2006.01)
*G06T 11/60* (2006.01)
*G06T 5/20* (2006.01)
*G06N 5/04* (2006.01)

(52) U.S. Cl.
CPC ............. *G06T 11/60* (2013.01); *G06N 5/046* (2013.01); *G06T 5/20* (2013.01); *G06T 2207/20081* (2013.01); *G06T 2207/20084* (2013.01)

(58) Field of Classification Search
None
See application file for complete search history.

(56) References Cited

PUBLICATIONS

Lahiri, Avisek, et al. "Improving Consistency and Correctness of Sequence Inpainting using Semantically Guided Generative Adversarial Network." arXiv preprint arXiv:1711.06106 (2017). (Year: 2017).*
Li, Chuan, and Michael Wand. "Preconnputed real-time texture synthesis with markovian generative adversarial networks." European conference on computer vision. Springer, Cham, 2016. (Year: 2016).*
Reed, Scott E., et al. "Learning what and where to draw." Advances in neural information processing systems. 2016. (Year: 2016).*
Sangkloy, Patsorn, et al. "Scribbler: Controlling deep image synthesis with sketch and color." Proceedings of the IEEE Conference on Computer Vision and Pattern Recognition. 2017. (Year: 2017).*

(Continued)

*Primary Examiner* — Sean M Conner
(74) *Attorney, Agent, or Firm* — Kilpatrick Townsend & Stockton LLP

(57) ABSTRACT

Certain embodiments involve using an image completion neural network to perform user-guided image completion. For example, an image editing application accesses an input image having a completion region to be replaced with new image content. The image editing application also receives a guidance input that is applied to a portion of a completion region. The image editing application provides the input image and the guidance input to an image completion neural network that is trained to perform image-completion operations using guidance input. The image editing application produces a modified image by replacing the completion region of the input image with the new image content generated with the image completion network. The image editing application outputs the modified image having the new image content.

20 Claims, 6 Drawing Sheets

(56) References Cited

PUBLICATIONS

Pathak, Deepak, "Context Encoders: Feature Learning by Inpainting", Computer Science, Computer Vision and Pattern Recognition, arXiv:1604.07379v2 [cs.CV], Nov. 21, 2016, 12 pages.

Deshpande, Adit, "Deep Learning Research Review Week 1: Generative Adversarial Nets", https://adeshpande3.github.io/adeshpande3.github.io/Deep-Learning-Research-Review-Week-1-Generative-Adversarial-Nets, Sep. 30. 2016, 10 pages.

Iizuka, Satoshi, et al., "Globally and Locally Consistent Image Completion", ACM Transactions on Graphics, vol. 36, Issue 4, Article No. 107, Jul. 2017, 13 pages.

Gulrajani, Ishaan, et al., "Improved Training of Wasserstein GANs", Advances in Neural Information Processing Systems 30, Computer Science Learning, arXiv:170400028v2[cs.LG], May 29, 2017, 19 pages.

Denton, Emily, et al., Deep Generative Image Models Using a Laplacian Pyramid of Adversarial Networks, Advances in Neural Information Processing Systems 28, Computer Science Learning,, arXiv:150605751v1[cs.CV], Jun. 18, 2015, 10 pages.

Smirnov, Evgeny, et al., "Comparison of Regularization Methods for ImageNet Classification with Deep Convolutional Neural Networks", AaSRT Procedia. 6, May 2014, 6 pages.

Deshpande, Adit, "A Beginner's Guide to Understanding Convolutional Neural Networks Part 2", https://adeshpande3.github.io/A-Beginner%27s-Guide-To-Understanding-Convolutional-Neural-Networks-Part-2/, Jul. 29, 2016, 9 pages.

Yang, Chao et al., "High-Resolution Image Inpainting using Multi-Scale Neural Patch Synthesis," Nov. 30, 2016, arXiv:1611.09969, 9 pages.

\* cited by examiner

Input Image 122

Mask Input 124

Guidance Input 126 modified image 122

USER-GUIDED IMAGE COMPLETION WITH IMAGE COMPLETION NEURAL NETWORKS

TECHNICAL FIELD

This disclosure relates generally to computer graphics processing. More specifically, but not by way of limitation, this disclosure relates to using an image completion neural network to perform image completion based on user guidance.

BACKGROUND

Image completion software receives an incomplete image (e.g., an image in which a certain portion has been removed) and adds synthesized image content to the image in those missing regions. For example, an incomplete image of a person's face could include a missing region on the face around where the eyes of the person would have been located. Image completion software receives the incomplete image as an input and generates an image content, such as an image patch depicting a new pair of eyes, to be added in the missing region. The image completion software merges the generated image patch with the incomplete image to output a modified image depicting a person's face with the new pair of eyes.

Existing image completion systems, however, present disadvantages. For example, the quality of modified images produced by existing image completion systems significantly varies depending on the complexity of the input. Such an existing image completion system may interpret an incomplete image in a way that is different from what a user may have in mind. Consequently, the existing image completion system may generate an image patch having content that does not appropriately match the semantic context of the rest of the image or is otherwise different from the kind of image content a user may want the system to produce.

SUMMARY

Certain embodiments involve using an image completion neural network to perform image completion based on user guidance. For example, an image editing application accesses an input image having a completion region to be replaced with new image content. The image editing application also receives a guidance input that is applied to a portion of a completion region. The image editing application provides the input image and the guidance input to an image completion neural network that is trained to perform image-completion operations using guidance input. The image editing application produces a modified image by replacing the completion region of the input image with the new image content generated with the image completion network. The image editing application outputs the modified image having the new image content.

These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
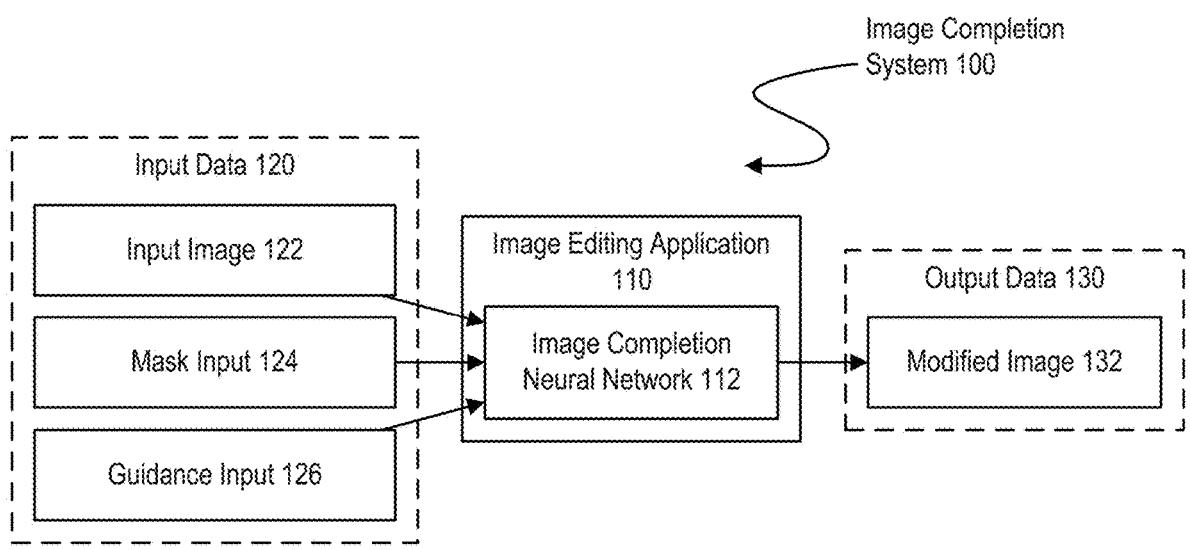
FIG. 1 depicts an image completion system that uses an image completion neural network to perform image completion based on user guidance, according to certain embodiments of the present disclosure.

Certain embodiments described herein provide a user-guided approach to performing image completion tasks, which involve, for example, generating image content for insertion into one or more completion regions of an incomplete image (e.g., regions having missing content or content to be replaced). These tasks image completion tasks are performed with an image completion neural network that is trained to generate, select, or otherwise obtain suitable image content for insertion based on one or more guidance inputs that a user has supplied for the completion region.

For instance, an image editing application performs an image completion task with respect to an incomplete input image or other input image having a particular region to be replaced. The image editing application receives a user guidance input with respect to the input image and provides the user guidance input to an image completion neural network. The image completion neural network is trained to perform one or more image completion operations based on certain shapes depicted by the user input. For instance, the image editing application could receive guidance input that includes two points within a missing region of an incomplete image of a person's face. The missing region corresponds to a region on the face corresponding to where the eyes of the person would otherwise be located. Accordingly, based these two points, the image completion neural network generates an image patch including a new pair of eyes such that the eyes may be centered around the two points indicated by the user.

Embodiments described herein introduce a number of techniques for incorporating user guidance into the image completion system. For instance, certain embodiments provide image completion neural networks having an input channel for receiving user guidance data, which allows the image completion neural networks to integrate user guidance data with other input channels (e.g., input channels representing features of an input image, mask inputs, etc.). The image completion neural network processes the guidance data along with an input image to generate a modified image.

By incorporating user guidance, certain embodiments described herein address the limitations of existing approaches to performing image completion tasks. For instance, user guidance inputs may improve the performance of an image completion system by providing the image completion system with information that allows the system to focus on relevant attributes of complex input image data.

For example, a user may provide the image completion system with an outline of a shape within a missing region of an incomplete image and thereby inform the image completion system to use an image completion approach involving generating additional objects and structures matching the user-provided outline rather than merely filling in textures. Thus, by providing the image completion system with a guidance indicating the nature of a particular object to be depicted (e.g., dots representing eyes, sketches representing a landscape, brush strokes representing desired textures, etc.), the image completion system more quickly and accurately determines what type of image content is depicted in the input image.

As a result, by being able to more effectively interpret the input image, the image completion system may be able to generate output images that are more realistic and appropriate given the semantic context of the input image. Additionally, this approach may further reduce the time and resources required to execute image completion tasks and train an image completion neural network to achieve the same output quality. Furthermore, since the image completion system uses a model that has learned how to limit the range of multiple possible image-completion solutions to a smaller set of possible solutions based on guidance from a user, the image completion system can focus processing resources on finding a particular solution from the smaller set of possible solutions, thereby allowing the image completion system to converge to an image-completion more quickly and with more stability.

These embodiments can provide improvements over existing image completion systems. For instance, although image completion tasks could be formulated as one-to-many problems in which many appropriate solutions are typically possible given one set of inputs, existing approaches to image completions are only able to provide a user with one solution given any set of inputs. Even if an existing image completion system that is trained to effectively generate a natural-looking output image, the output image may nevertheless differ from what a user may want. By contrast, an image completion system described herein can utilize user guidance input to determine which particular solution from among the possible solutions may be more desirable for an end user. In this way, the user guidance input may help to narrow down the range of possible solutions and therefore increase the likelihood that the image completion system would generate a desirable outcome.

An "incomplete image," as used in the present application, may refer to an image having one or more regions that are lacking in image content. For example, an incomplete image may include regions that are completely white or transparent. Similarly, an image may include a region that has been defined by a mask input such that removing the defined region from the image would produce an incomplete image.

A "modified image," as used in the present application, may refer to an image including a region including image content that has been generated by an image completion system.

A "function," as used in the present application, may refer to any differentiable function, such as a neural network, that may generate a set of outputs based on a set of inputs. Functions may include neural networks. A guidance function may refer to a function for generating image guidance input. Examples of a guidance function include pre-trained networks such as a sketch-detection network or a semantic segmentation network. Additional examples of a guidance function include linear operators, such as SIFT and a CANNY edge detector.

The terms, "guidance input," "user guidance," "user guidance input," "image guidance," "training guidance data," and "output image guidance," as used in the present application, may refer to a type of data, collectively referred to as "guidance data," that may be supplied to an image completion neural network to inform the network on how to perform an image completion task. In particular, "user guidance," "guidance input," and "user guidance input" may refer to image completion guidance data that is generated and provided by a user and supplied to the image completion neural network during execution. Accordingly, "image guidance data," "image guidance," "training guidance data," and "output image guidance" may refer to training data is provided to simulate user guidance input data for training the image completion neural network. Image guidance data may be provided by a user and/or computer generated.

The term "natural" and "natural-looking," as used in the present application, may describe images as having an appearance of a digital photograph that could plausibly have been taken of a scene in a real-world environment, rather than having an appearance that suggests that the image was computer-generated. Discriminator networks in image completion systems may be trained to differentiate natural image from image containing portions that were computer-generated.

Examples of Systems and Methods for Image Completion with User Guidance

Referring now to the drawings, FIG. 1 depicts an example of an image completion system 100 including an image editing application 110. The image editing application 110 may be a software application that is implemented on one or more hardware devices, such as a desktop computer, laptop, a cloud application on one or more server systems, a tablet device, or a mobile device.

The image editing application 110 includes (or uses) an image completion neural network 112. The image completion neural network 112 includes a sequence of multiple layers of connected nodes. A node may receive one or more inputs, apply weights to the inputs, and combine the weighted inputs to generate an output. By using a combination of weights and threshold, a node on a neural network may generate an output based on one or more inputs.

In one example, the image completion neural network 112 is a fully convolutional encoder-decoder network framework that receives, as inputs, incomplete input images 122 (3-channel), mask input 124 (1-channel) and guidance input 126. The guidance input 126 can be images (e.g. sketches, semantic brushes, candidate patches) and labels (e.g. attributes, objects). Examples of features indicated by the guidance input 126 include objects, such as outlines of a cloud in a sky or a window in a wall, and textures, such as a set of parallel curves indicating the appearance of hair or dots representing a rough or uneven surface. To integrate the guidance input 126, the image completion neural network 112 transforms guidance information, which is included in or derived from the guidance input 126, into a feature and concatenates that feature in a completion network.

An input layer of the image completion neural network 112 receives input data 120. In some embodiments, the input data 120 includes an input image 122 (e.g. a photograph of a hillside landscape), one or more mask input 124, and one or more user guidance inputs 126. Other input data 120 combinations and configurations may also be used in alternative embodiments. In other embodiments, the input data 120 includes an input image 122 having a missing region and a guidance input 126.

In one example, the input image 122 is represented as a data structure having a two-dimensional array of pixels, in which each pixel has four associated values including a red, green, and blue value, as well as an intensity value. This data structure could be a three-dimensional array having dimensions of a length by a width by a depth of four, wherein the length and width correspond to the dimensions of the input image and the depth of four corresponds to the four values associated with each pixel.

The mask input 124 may be a selection of a region on the input image 122 and may be any shape such as a rectangular shape. The mask input 124 may be represented as a two-dimensional array of binary values wherein a one represents that a corresponding pixel on the input image 122 is within the selected region and a zero represents that the corresponding pixel is not selected.

The guidance input 126 includes, for example, one or more user inputs received by the image editing application 110 that generate or otherwise provide image completion guidance data. In some embodiments, the guidance input 126 includes images (e.g. sketches, semantic brushes, candidate patches). In additional or alternative embodiments the guidance input 126 includes labels (e.g. metadata applied to or included in attributes, objects, etc.).

An output layer of the image completion neural network 112 computes output data 130. The output data 130 includes a modified image 132 that is generated by the image completion neural network 112 based on the input data 120.

Figure 2:
FIG. 2 illustrates examples of input and output data used and produced by the image completion system of FIG. 1, according to certain embodiments of the present disclosure.
Figure 2:
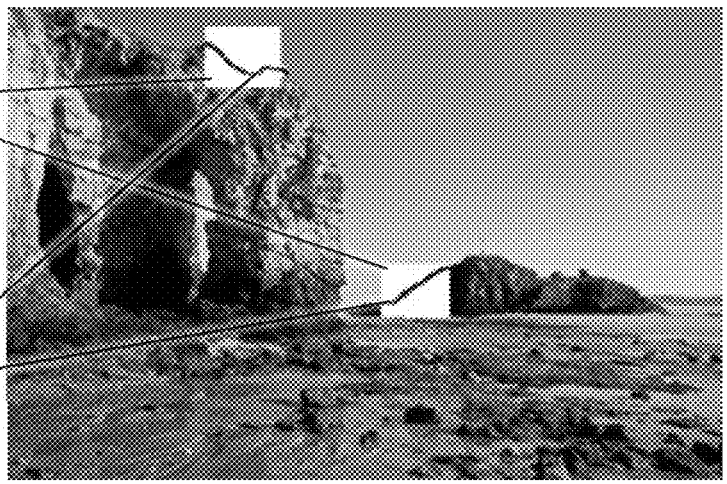
Figure 2:
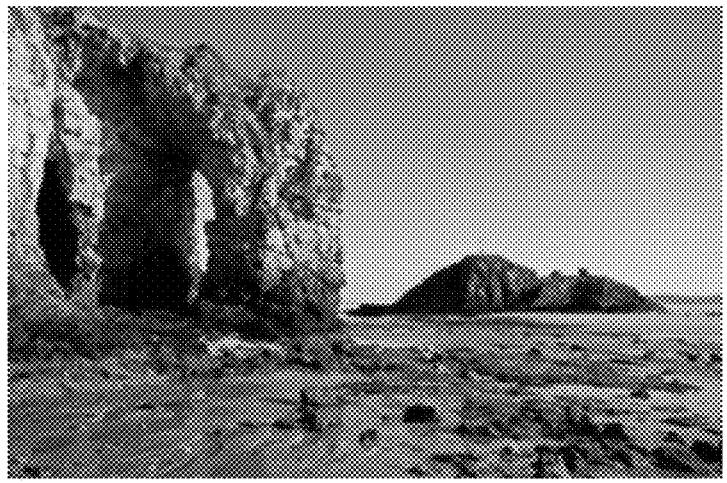

FIG. 2 illustrates examples of input data 120 and output data 130 used and produced by the image completion system 100. As shown in FIG. 2, the input data 120 includes an input image 122, two mask input 124, and two guidance inputs 126. The input image 122 includes a photograph of a scene in a real-world environment, such as a natural landscape. For example, in addition to landscapes, the input image 122 may also depict man-made structures, animals, or people. In addition to scenes of real-world environments, the input image 122 may also include scenes of environments not found in the real world, such as an image of a forest having trees that have been placed or modified by a human user or a computer. The input image 122 may further include image content that are fictional, fantastical and abstract, such as images of cartoon characters, paintings, or geometric shapes. Depending on how the image completion neural network 112 may be trained and configured, it may be able to perform image completion tasks based on input images 122 having any kind of image content.

The input data 120 may further include two mask input 124 as shown in FIG. 2. The mask input 124 includes two rectangular regions. The mask input 124 includes regions having other shapes in alternative embodiments. The mask input 124 may further be provided by a user, such as by drawing a rectangular shape over a display of the input image 122, or may be randomly generated by a computer, or provided using any other method. These mask input 124 may be overlaid onto the input image 122 to indicate a region on the input image 122 for which new image patches may be generated. In one embodiment, the mask input 124 may be combined with the input image 122 and together provided to the image completion neural network 112 to perform an image completion task. In alternative embodiments, the mask input 124 may be used to remove those regions on the input image 122 indicated by the mask input 124 from the input image 122 to produce an incomplete input image. The incomplete input image may then be provided to the image completion neural network 112 for performing image completion operations.

The input data 120 may further include two guidance inputs 126. These guidance inputs 126 includes a user-submitted sketch or outline, as shown in FIG. 2. The user may provide the user guidance inputs 126 by drawing an outline over a display of the input image 122 and/or the mask input 124 such that the outline may be overlaid on the input image 122 and/or the mask input 124. In one embodiment, the guidance inputs may be confined within the region specified by the mask input 124. The guidance inputs 126 may also exceed the mask input 124 region in alternative embodiments. In this way, the user may provide some guidance on how the image completion neural network 112 may fill in the regions specified by the mask inputs based on the user's sketch. Other types of guidance inputs 126 may also be used in according to embodiments, such as additional image patches and user-supplied domain labels. For example, a user may provide the image completion neural network 112 with guidance inputs 126 in the form of image patches to instruct the image completion neural network 112 to generate a new image patch that is similar to the image patches provided.

Based on these input data 120, the image completion neural network 112 may generate a modified image 132 such as the one shown in FIG. 2. For example, the output image may take the guidance input 126 into consideration and fill in the missing region by extending the rock and sky regions to conform with the outline provided by the user as part of the user guidance input 126. Depending on how the image completion neural network 112 is trained, the network may interpret the interaction between the user guidance input 126 and the input image and mask input 124 in different ways. While in this example, the image completion neural network 112 may have interpreted the sketch as joining the edge of the mountain on one side of the masked region with an edge on the other side of the region, other embodiments may interpret the outline as being an indication to create a blending between the sky and mountain regions. The exact solution will depend on the training process and the feedback data that a user may provide to the image completion neural network 112 as part of the training process. An example of training the image completion neural network 112 is described herein with respect to FIG. 5. In alternative embodiments, rather than outputting a modified image as shown in FIG. 2, the image completion neural network 112 may simply output the generated image patches corresponding to the masked regions on the input image as indicated by the mask input 124.

Figure 3:
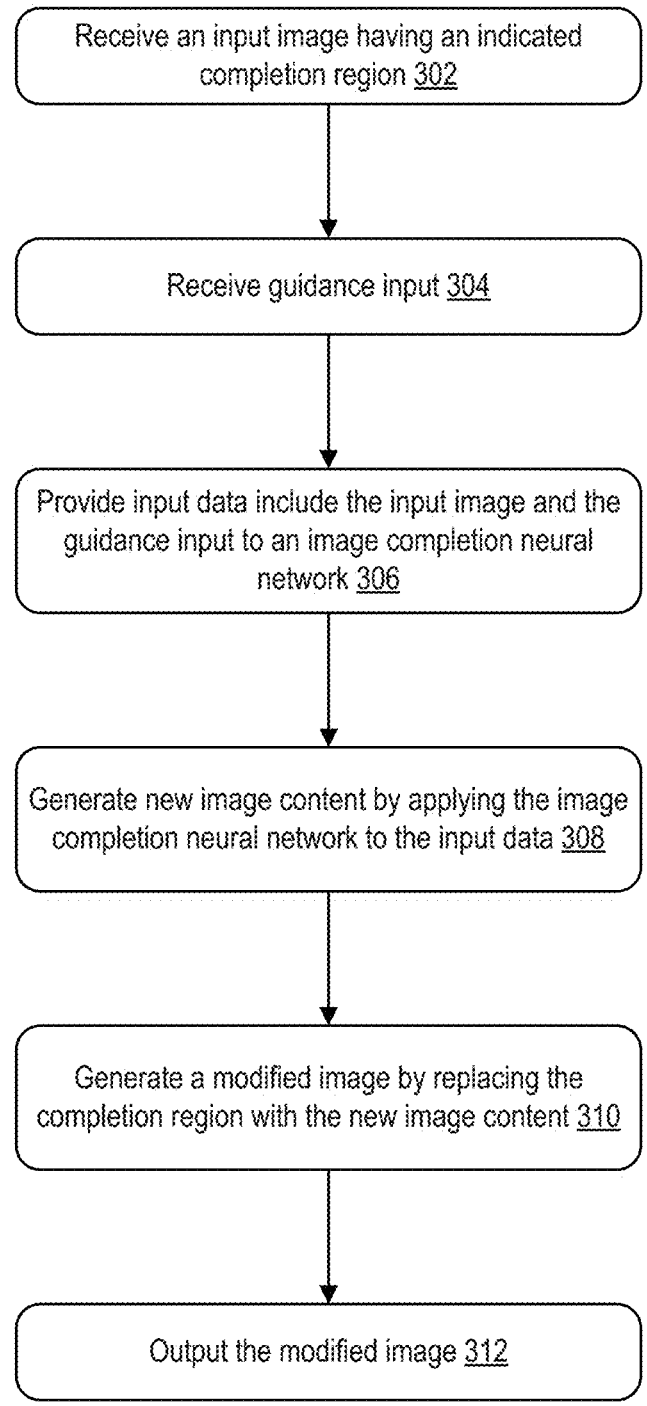
FIG. 3 depicts an example of a method of using an image completion system to generate a modified image, according to certain embodiments of the present disclosure.

FIG. 3 depicts an example of method for using the image completion system 100 (or other suitable computing system) to generate a completed modified image 132 based on an input image 122. For illustrative purposes, the method depicted in FIG. 3 is described with reference to certain examples depicted in the figures. For instance, in some embodiments, one or more processing devices implement operations depicted in FIG. 3 by executing suitable program code (e.g., the image editing application 110). Other implementations, however, are possible.

At block 302, the image editing application 110 receives or otherwise accesses an input image 122 having one or more completion regions. One or more processing devices execute the image editing application 110 or other program code to implement block 312. For instance, executing the image editing application 110 causes one or more processing devices to access one or more input images 122 that are stored in a non-transitory computer-readable medium. In some embodiments, accessing the input image 122 involves communicating, via a data bus, suitable signals between a local non-transitory computer-readable medium and the processing device. In additional or alternative embodiments, accessing the input image 122 involves communicating, via a data network, suitable signals between a computing system that includes the non-transitory computer-readable medium and a computing system that includes the processing device.

In some embodiments, the completion region includes a masked region. For instance, the image editing application 110 receives a mask input 124, an example of which is depicted in FIG. 2, from an input device. The mask input defines a completion region of the input image 122. In additional or alternative embodiments, the completion region includes a missing region on the input image 122 (e.g., a blank spot where image content has been removed). The image editing application 110 is used to generate image patches to be inserted into the missing region. In this case, the set of input data 120 provided to an image completion neural network 112 may not need to include a mask input since the input image already contain completion regions to be filled in by the image completion neural network 112. In additional or alternative embodiments, an incomplete image is combined with additional mask inputs indicating one or more additional masked regions on the incomplete image. The image completion neural network 112 is used to insert image content in both the missing regions in the original incomplete input image and the newly added masked regions on the incomplete input image (i.e., masked regions indicated by the user-supplied mask input 124).

At block 304, the image completion neural network 112 receives guidance input 126. The guidance input 126 includes, for example, one or more user inputs that are applied to one or more portions of an input image 122 (e.g., by overlaying the guidance input 126 on a portion of the input image 122). In the example illustrated in FIG. 2, the guidance input 126 includes a sketch or outline, but any suitable user inputs providing data that guides the selection of replacement content for the completion region may be used. The image editing application 110 receives the user guidance input 126 in any suitable manner and, in some embodiments, displays the guidance input 126 (either alone or along with the mask input 124) on a display device. For example, if the image editing application 110 is executed on a tablet device, the input image 122 is displayed on a touchscreen of the tablet device. The image editing application 110 receives inputs provided by a touch pen of the tablet device that draw the outline on the touchscreen and over the displayed input image 122. This sketch may be confined to the completion regions or may be overlaid onto any portion of the input image. The guidance input can be displayed as feedback by showing the outline the user has down on the touch screen of the tablet device.

The image editing application 110 transforms the input image 122 into a modified image 132 by using the various input data 120 in combination with the image completion neural network 112 to add image content to the completion region. This transformation operation includes one or more blocks 308-312.

Figure 4:
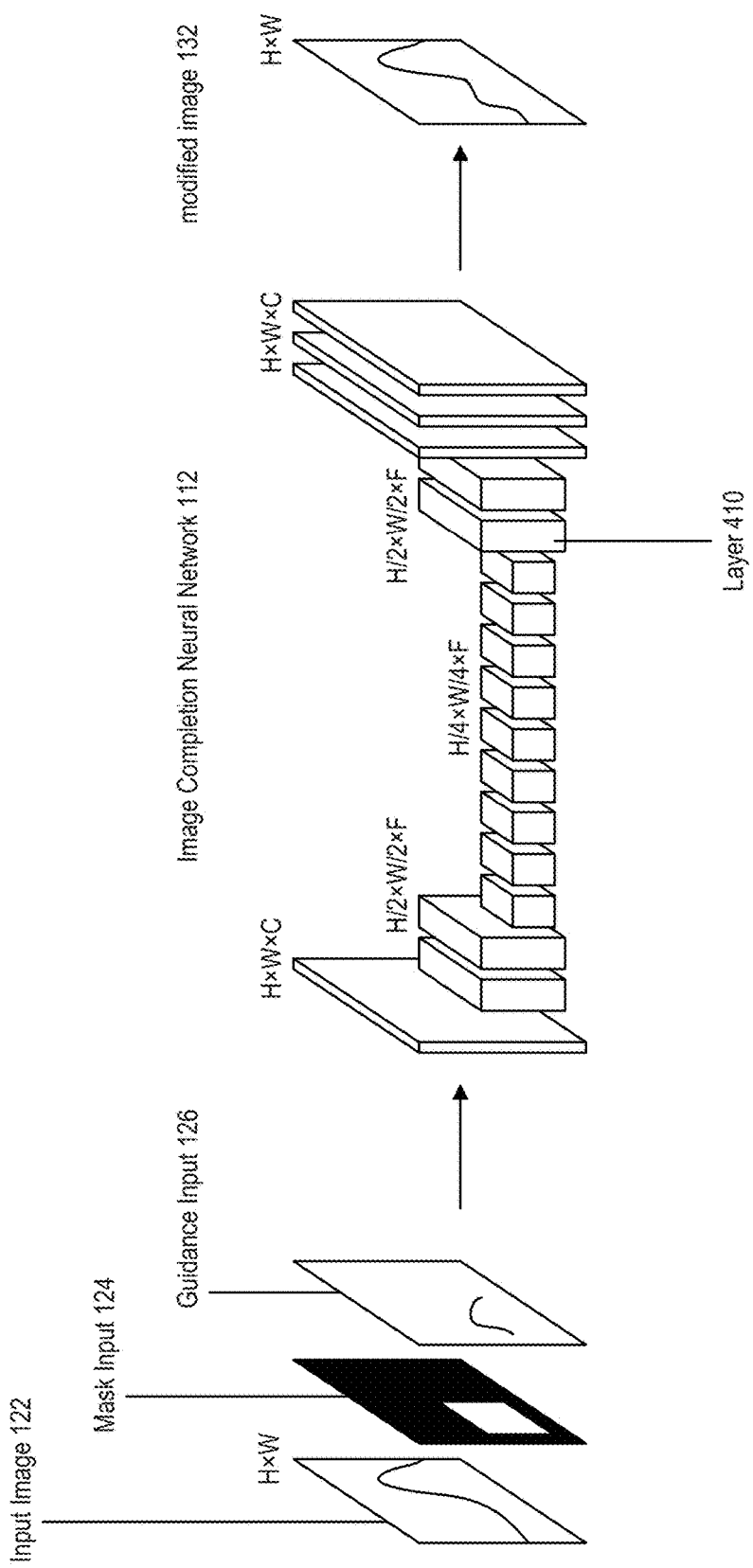
FIG. 4 depicts an example of an image completion neural network from FIG. 1, according to certain embodiments of the present disclosure.

For instance, at block 306, the input image 122, the guidance input 126, and (in some embodiments) the mask input 124 are provided to an image completion neural network 112. The image completion neural network 112 is trained to predict (i.e., synthesize) content to be added to an image (e.g., via image inpainting or another suitable image-completion operation) based at least in part on one or more guidance inputs. For instance, the image completion neural network 112 can match one or more visual properties of new image content to be added to the image, such as textures of a surface or shape of an object, to an appropriate image-completion solution (e.g., a particular technique, a particular portion of an image to be used as the basis for an in-painting operation, or some combination thereof). FIG. 4 depicts an example of the components of the image completion neural network 112. The image completion neural network 112 includes a set of layers 410 in a dilated convolutional neural network.

The example of an image completion neural network 112 depicted in FIG. 4 includes 17 layers, though other implementations are possible. One example of an implementation of the network is provided in Table 1 below.

TABLE 1

| Layer | Kernel | Dilation | Stride |
|---|---|---|---|
| 1 | 5 × 5 | 1 | 1 × 1 |
| 2 | 3 × 3 | 1 | 2 × 2 |
| 3 | 3 × 3 | 1 | 1 × 1 |
| 4 | 3 × 3 | 1 | 2 × 2 |
| 5 | 3 × 3 | 1 | 1 × 1 |
| 6 | 3 × 3 | 1 | 1 × 1 |
| 7 | 3 × 3 | 2 | 1 × 1 |
| 8 | 3 × 3 | 4 | 1 × 1 |
| 9 | 3 × 3 | 8 | 1 × 1 |
| 10 | 3 × 3 | 16 | 1 × 1 |
| 11 | 3 × 3 | 1 | 1 × 1 |
| 12 | 3 × 3 | 1 | 1 × 1 |
| 13 | 3 × 3 | 1 | 1 × 1 |
| 14 | 3 × 3 | 1 | 1 × 1 |
| 15 | 3 × 3 | 1 | 1 × 1 |
| 16 | 3 × 3 | 1 | 1 × 1 |
| 17 | 3 × 3 | 1 | 1 × 1 |

In this example, a downscale operation with a factor of 2 or an upscale operation with a factor of 2 occurs between layers 1 and 2, between layers 3 and 4, between layers 12 and 13, and between layers 14 and 15.

The sequence of multiplier layers of nodes includes an input layer, an output layer, and multiple intermediate layers. The input layer may be the first layer in the sequence of layers and the output layer may be the last layer in the sequence of layers. Each node on the input layer of the image completion neural network 112 may be connected to one or more nodes in a subsequent intermediate layer such that the output from the node on the input layer may be provided to the one or more connected nodes on the subsequent intermediate layer. In addition, each node in an intermediate layer may be similarly connected to one or more nodes in a previous layer and one or more nodes in a subsequent layer such that the node in the intermediate layer may receive the outputs from the one or more connected nodes in the previous layer and provide an output to the one or more nodes in the subsequent layer. The output layer may further be similarly connected to one or more nodes in a previous intermediate layer of the image completion neural network 112.

An image completion neural network may be arranged as a convolutional neural network ("CNN"). Other arrangements may also be used in alternative embodiments. Layers in a convolutional neural network may be arranged in a two-dimensional or three-dimensional arrangement, or any other arrangement, according to certain embodiments of the present disclosure. CNN may further include one or more convolutional layers. Each node in a convolutional layer may be connected to a subset of nodes in a previous layer.

Each convolutional layer may further have an associated filter or kernel that determines the connectivity of the nodes in the convolutional layer. For example, a filter may determine that each node in a convolutional layer is connected to a subset of nodes in a previous layer such that the subset of nodes include 25 nodes arranged as a 5 by 5 square in the previous layer at a position on the previous layer corresponding to the position of the node on the convolutional layer. Accordingly, the subset of nodes to which a particular node in a convolutional layer is connected may be described as a receptive field. In this way, each node in a convolutional layer focuses on processing a localized portion of the nodes in a previous layer and tries to find insights about the localized cluster of nodes within the convolutional layer node's receptive field.

Returning to FIG. 3, at block 308, the image completion neural network 112 and generates new image content from the input data received at block 306. One or more processing devices execute the image editing application 110 or other program code to implement block 308 by applying image inpainting or another suitable image-completion algorithm, in accordance with the guidance input, to generate new image content. The new image content includes, for example, an image patch matching the dimensions of the completion region. The image content could be considered "new" in that the image content was not previously present in the completion region. This "new" image content could, for example, be mirrored from other regions in the input image 122, synthesized or otherwise derived from other regions in the input image 122, taken from a separate image, etc.

In some embodiments, the image completion neural network 112 can match the guidance input to one or more portions of an input image that should be used as the basis for image-completion operations in the missing region, or otherwise select the input image portion as a basis for image completion based on the guidance input. In one example, if an input image depicts a landscape against a sky and guidance input in the completion region indicates a desired boundary between a synthesized landscape portion and a synthesized sky portion, the image completion neural network 112 can use the sky portion of the image for inpainting on one side of the user-provided boundary line (e.g., the side closer to the existing sky portion) and use the landscape portion of the image for inpainting on another side of the user-provided boundary line (e.g., the side closer to the existing landscape portion). In another example, if an input image depicts a building with multiple windows and guidance input in the completion region includes a sketch of a window shape, the image completion neural network 112 can mirror an existing window into the completion region rather than, for instance, simply filling in the completion region with image content from a wall surrounding the completion region. In another example, if an input image depicts an object with a roughly textured surface and a smoothly textured surface and guidance input in the completion region includes brush strokes indicating a rough surface, the image completion neural network 112 can generate new image content similar to the roughly textured surface for filling in the completion region. Additionally or alternatively, if an input image depicts an object with a smoothly textured surface and guidance input in the completion region includes brush strokes indicating a rough surface, the image completion neural network 112 can generate new image content by mirroring the smoothly textured surface and applying a textured appearance to the mirrored content.

At block 310, the image editing application 110 combines the newly generated image content with the input image 122 by replacing the completion region with the newly generated image content. One or more processing devices execute the image editing application 110 or other program code to implement block 310. For instance, the image editing application 110 replaces color information for a given pixel of the completion region with color information from a corresponding pixel of the completion region. The image editing application 110 repeat this pixel-wise replacement operations for a set of pixels in the completion region using a corresponding set of pixels from the newly generated image content. Replacing the completion region with the newly generated image content produces a modified image having the newly generated image content along with at least of original content from the input image 122 outside the completion region.

At block 312, the modified image 132 is outputted (e.g., presented to the user). One or more processing devices execute the image editing application 110 or other program code to implement block 312. In some embodiments, the image editing application 110 configures (or otherwise causes) a presentation device to display the modified image 132. In one example, a processing device could communicate, via a data bus, suitable signals between a local non-transitory computer-readable medium and a display device that cause the display device to render the modified image 132. In another example, a processing device could communicate via a data network, signals between a computing system that includes a non-transitory computer-readable medium storing the modified image 132 and a computing system that includes the display device, where the signals cause the display device to render the modified image 132. In additional or alternative embodiments, the image editing application 110 provides the modified image 132 to one or more other applications for further processing.

Examples of Training an Image Completion Neural Network

Figure 5:
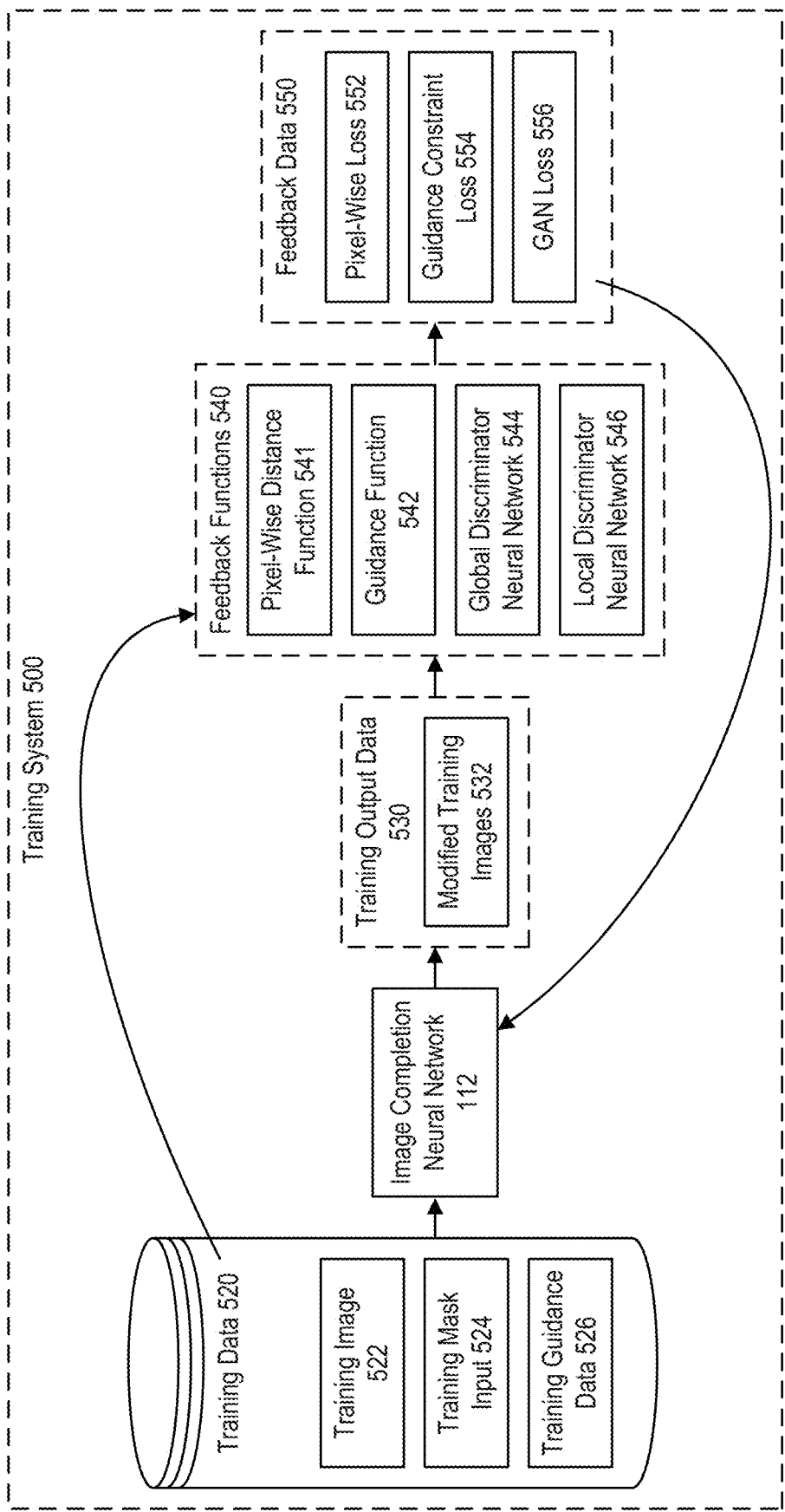
FIG. 5 depicts an example of a training computing system that provides a trained image completion neural network to the image completion system of FIG. 1, according to certain embodiments of the present disclosure.

FIG. 5 depicts an example of a training computing system 500 that performs one or more training processes that output a trained image completion neural network 112 to an image editing application 110. A training process involves, for example, iteratively tuning or otherwise modifying the image completion neural network 112 based on training output data 530 (e.g., modified training images 523) that is generated by the image completion neural network 112 using training data 520 (e.g., training images 522, training mask data 524, training guidance data 526). For instance, the training computing system 500 generates new training image content to be added to one or more training images 522 having one or more training completion regions, which could be indicated by training mask data 524. Iteratively tuning or otherwise modifying the image completion neural network 112 includes one or more of adjusting weights applied to different nodes in the image completion neural network 112, inserting or removing layers within the image completion neural network 112, inserting or removing connections between nodes in different layers of the image completion neural network 112, etc.

In some embodiments, a training computing system 500 performs these modifications to the image completion neural network 112 using a guidance function 542 that generates training guidance data 526 as a function of a given training image, where the training guidance data 526 simulates guidance data that could be provided by a user at runtime. Examples of the guidance function 542 include a sketch detection neural network, a semantic segmentation neural network, and a scale-invariant feature transform ("SIFT") edge detector, a Canny edge detector, etc. The training computing system 500 provides the training image and the training guidance data 526 to an image completion neural network 112 that is being trained. The image completion neural network 112 generates the new training image content from the training guidance data 526 and the training image and replaces the training completion region with the generated new training image content to produce a modified training image.

Continuing with this example, the training computing system 500 provides the modified training image to one or more feedback functions 540. The training computing system 500 generates feedback data 550 by applying one or more feedback functions 540 to appropriate training data (e.g., one or more of a training image 522 and a corresponding modified training image 532). The feedback data 550 includes one or more feedback metrics, such as a pixel-wise loss 552, a guidance constraint loss 554, and a generative adversarial net ("GAN") loss 556. The training computing system 500 updates, based on the one or more feedback metrics, the image completion neural network 112.

An example of a feedback metric is a guidance constraint loss 554. In this example, the feedback function 540 include one or more operations performed by a guidance neural network. The guidance neural network can have an architecture that is identical (or similar) to a network used to implement the guidance function 542. The guidance neural network is trained or otherwise configured to generate training guidance data 526 as a function of the training image.

To generate a guidance constraint loss 554, the training computing system 500 applies the guidance neural network to a training completion region of a training image to produce training guidance data 526. The training computing system 500 also applies the guidance neural network to the new training image content within the modified training image to produce output image guidance. The training computing system 500 computes, with a pixel-wise distance function 541, a pixel-wise distance between the training guidance data 526 and the output image guidance to generate the guidance constraint loss 554. For instance, a higher guidance constraint loss 554 indicates a greater difference between the input training guidance (i.e., the training guidance data 526 used for an image completion operation) and the output training guidance (i.e., the training guidance data 526 extracted from the modified training image). This greater difference indicates that the image completion neural network 112 is not properly applying the guidance data (i.e., generating new image content in accordance with the guidance data), and therefore should be adjusted.

In some embodiments, input training guidance (i.e., the training guidance data 526 used for an image completion operation of the training process) may be represented as Guidance$_{input}$=G(x)∘m. In this function, the term G represents a guidance function for computing training guidance data 526 from image content, the term x represents a training image that is used as an input to the guidance function, and the term m represents an image mask (i.e. with ones representing pixels that are masked and zeros representing other pixels. Additionally, the output training guidance (i.e., training guidance data extracted from the modified training image) may be represented as Guidance$_{input}$=G(x*)∘m, where x* is a predicted modified image (i.e., a modified training image following an image completion operation).

In one example, the guidance constraint loss 554 can be calculated with the following formula:

$$L_{constraint} = l_1(Guidance_{output}, Guidance_{input}) \text{ or }$$
$$l_2(Guidance_{output}, Guidance_{input}).$$

In this example, $L_{constraint}$ is the guidance constraint loss, $l_1(\cdot)$ is the $l_1$-norm and $l_2(\cdot)$ is the $l_2$-norm. In additional or other embodiments, $L_{constraint}$ can be computed using one or more other suitable loss functions (e.g., loss functions other than the $l_1$ or $l_2$ operation). A suitable loss function measures a distance between input training guidance (i.e., the training guidance data 526 used to perform an image completion operation) and output training guidance (i.e., the training guidance data extracted from the modified training image).

Other examples of a feedback metric include a GAN loss 556 and a pixel-wise loss 552. A GAN loss 556 is generated by a feedback function 540 that includes one or more operations applied by a global discriminator neural network 544. A pixel-wise loss 552 is generated by a feedback function 540 that includes one or more operations applied by a local discriminator neural network 546. To generate a GAN loss 556, the training computing system 500 applies the global discriminator neural network 544 on the modified training image and applies the local discriminator neural network 546 to the new training image content within the modified training image. The training computing system 500 computes a GAN loss 556 based on the modified training image using the global discriminator neural network 544 and the local discriminator neural network 546. In some embodiments, the training computing system 500 may implement an improved Wasserstein GAN ("WGAN") loss. A WGAN loss optimizes a discriminator using a value function, such as $$\min_G \max_{D \in \mathcal{D}} \mathbb{E}_{x \sim \mathbb{P}_r}[D(x)] - \mathbb{E}_{\tilde{x} \sim \mathbb{P}_g}[D(\tilde{x})],$$

where $\mathbb{P}_r$ is a data distribution, and $\mathbb{P}_g$ is a model distribution, and $\mathbb{E}$ is an expected value for a particular network or other function D(•). For example, a WGAN leverages the Wasserstein distance to produce a value function having better theoretical properties than the original GAN. WGAN uses a discriminator that lies within the space of 1-Lipschitz functions, which may be enforced through weight clipping.

In additional or alternative embodiments, the improved WGAN uses a gradient penalty. A differentiable function is 1-Lipschitz if the differentiable function has gradients with a maximum norm of 1 throughout. This constraint may be enforced with a penalty on the gradient norm of random samples $\hat{x} \sim \mathbb{P}_{\hat{x}}$. An example of an objective function to compute a WGAN loss is:

$$L = \mathbb{E}_{\tilde{x} \sim \mathbb{P}_g}[D(\tilde{x})] - \mathbb{E}_{x \sim \mathbb{P}_r}[D(x)] + \lambda \mathbb{E}_{\hat{x} \sim \mathbb{P}_{\hat{x}}}[(\|\nabla_{\hat{x}} D(\hat{x})\|_2 - 1)^2].$$

The training computing system 500 computes the pixel-wise loss 552 from a pixel-wise distance between the training image and the modified training image. In some embodiments, the training computing system 500 combines the guidance constraint loss 554 with the GAN loss 556 and the pixel-wise loss 552.

Any suitable global discriminator neural network 544 can be used in the training computing system 500. One example of an architecture for a global discriminator neural network 544 is depicted in Table 2. A fully-connected layer is used at the output of the global discriminator neural network 544.

TABLE 2

| Layer | Kernel | Dilation | Stride |
|---|---|---|---|
| 1 | 5 × 5 | 1 | 2 × 2 |
| 2 | 5 × 5 | 1 | 2 × 2 |
| 3 | 5 × 5 | 1 | 2 × 2 |
| 4 | 5 × 5 | 1 | 2 × 2 |

Any suitable local discriminator neural network 546 can be used in the training computing system 500. One example of an architecture for a local discriminator neural network 546 is depicted in Table 3. A fully-connected layer is used at the output of the local discriminator neural network 546.

TABLE 3

| Layer | Kernel | Dilation | Stride |
|---|---|---|---|
| 1 | 5 × 5 | 1 | 2 × 2 |
| 2 | 5 × 5 | 1 | 2 × 2 |
| 3 | 5 × 5 | 1 | 2 × 2 |
| 4 | 5 × 5 | 1 | 2 × 2 |
| 5 | 5 × 5 | 1 | 2 × 2 |
| 6 | 5 × 5 | 1 | 2 × 2 |

In some embodiments, the training computing system 500 implements a deformable training process that involves performing one or more deform operations on training images to generate deformed training images. A deformed training image can be used to simulate the imperfection of user guidance inputs (e.g., non-straight lines or jittery curves causes by a shaking of a user's hand or other input element on a touchscreen or other input device). Applying the guidance function 542 to a deformed training image results in artificially created guidance data that more accurately simulates the guidance inputs that may be provided by a user (e.g., deformed detected edges that mimic imperfectly drawn curves on a touchscreen). Examples of a deform operation include warping, retargeting, PatchMatch, etc. The training computing system 500 uses the deformed training images in the process described above to train the image completion neural network 112. For instance, the training computing system 500 applies a guidance function 542 to a deformed training image to generate guidance data, modifies an image completion region of a training image (e.g., the deformed training image or the corresponding un-deformed training image) based on the generated guidance data, and adjusts the image completion neural network 112 based on one or more feedback metrics with respect to the resulting modified training image.

For example, deformed training images can be used to generate synthetic training guidance for training an image completion neural network. Deformed images are generated by deforming raw images to enforce constraint of their guidances during training. In one example, a raw image depicting a house with a doorframe and a door can be deformed such that straight edges from the raw image (e.g., edges of the doorframe and door) are curved or otherwise skewed, thereby causing the doorframe and the door, as depicted in the deformed image, to have angles or curves that are not present in the raw image. These angles or curves could be used to model user input guidance in which a door or door frame is not drawn with perfectly straight lines.

In some embodiments, the training computing system 500 is included in the image completion system 100. In other embodiments, the training computing system 500 is separate from the image completion system 100 and provides the image completion neural network 112 to the image completion system 100. One example of providing the image completion neural network 112 to the image completion system 100 includes transmitting the image completion neural network 112, as trained, to a computing device that executes the image completion system 100. Another example of providing the image completion neural network 112 to the image completion system 100 includes storing the image completion neural network 112, as trained, in a non-transitory computer-readable medium that is accessible, via a data network, to a computing device that executes the image completion system 100.

Example of a Computing System to Implement Various Embodiments

Figure 6:
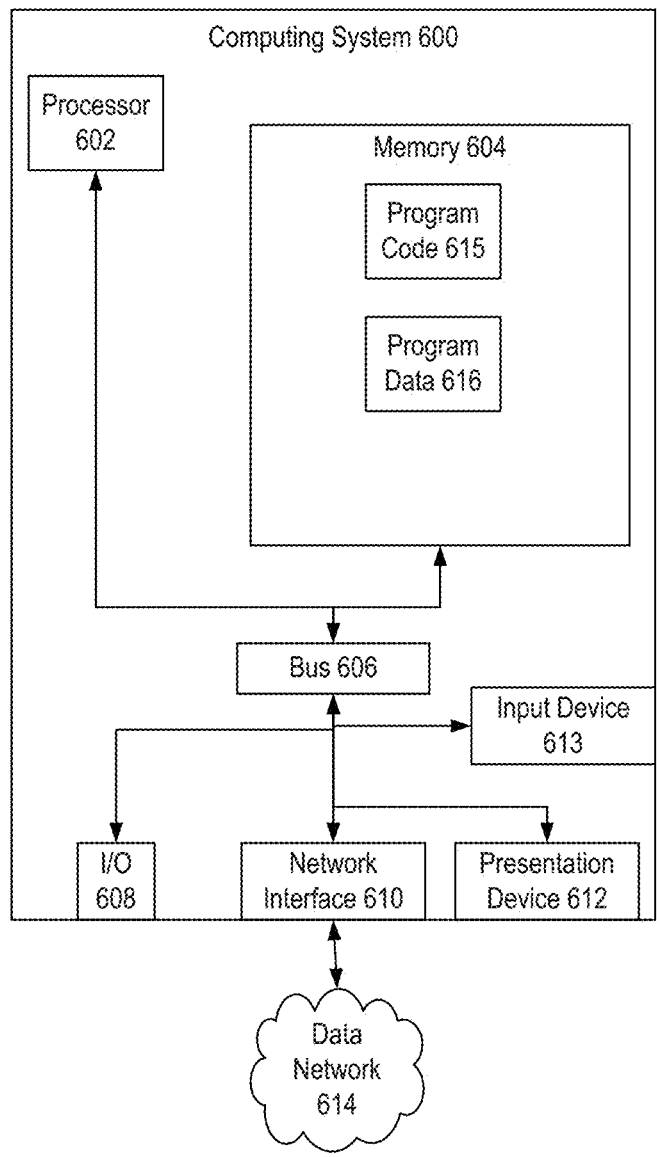
FIG. 6 depicts an example of a computing system for implementing one or more embodiments of the present disclosure.

Any suitable computing system or group of computing systems can be used for performing the operations described herein. For example, FIG. 6 depicts an example of the computing system 600. The implementation of computing system 600 could be used for one or more of an image completion system 100 and a training computing system 500. In some embodiments, a single computing system 600 having the devices depicted in FIG. 6 (e.g., a processor, a memory, etc.) combines the one or more operations and data stores depicted as separate systems in FIGS. 1 and 5. In other embodiments, two computing systems 600, each having one or more of the devices depicted in FIG. 6 (e.g., a processor, a memory, etc.), separately implement different subsets of the operations and data stores depicted in FIGS. 1 and 5.

The depicted example of a computing system 600 includes a processor 602 communicatively coupled to one or more memory devices 604. The processor 602 executes computer-executable program code stored in a memory device 604, accesses information stored in the memory device 604, or both. Examples of the processor 602 include a microprocessor, an application-specific integrated circuit ("ASIC"), a field-programmable gate array ("FPGA"), or any other suitable processing device. The processor 602 can include any number of processing devices, including a single processing device.

The memory device 604 includes any suitable non-transitory computer-readable medium for storing program code 615, program data 616, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C #, Visual Basic, Java, Python, Perl, JavaScript, and ActionScript.

The computing system 600 may also include a number of external or internal devices, such as input or output devices. For example, the computing system 600 is shown with one or more input/output ("I/O") interfaces 608. An I/O interface 608 can receive input from input devices or provide output to output devices, such as a presentation device 612. One or more buses 606 are also included in the computing system 600. The bus 606 communicatively couples one or more components of a respective one of the computing system 600.

The computing system 600 executes program code 615 that configures the processor 602 to perform one or more of the operations described herein. Examples of the program code 615 include, in various embodiments, the image editing application 110, a training engine executed by the training computing system 500 to perform the operations described above with respect to FIG. 5, or other suitable applications that perform one or more operations described herein. The program code may be resident in the memory device 604 or any suitable computer-readable medium and may be executed by the processor 602 or any other suitable processor.

The computing system 600 can access program data 616 (e.g., an input image 122 or other input data, the image completion neural network 112, training data 520, etc.) in any suitable manner. In some embodiments, one or more of these data sets, models, and functions are stored in the same memory device (e.g., one of the memory devices 604). In additional or alternative embodiments, one or more of the programs, data sets, models, and functions described herein are stored in different memory devices 604 accessible via a data network.

The computing system 600 also includes a network interface device 610. The network interface device 610 includes any device or group of devices suitable for establishing a wired or wireless data connection to one or more data networks 614, via which communications with a user device can occur. Non-limiting examples of the network interface device 610 include an Ethernet network adapter, a modem, etc. The computing system 600 is able to communicate with one or more other computing devices (e.g., a user device executing a client application or a graphic manipulation application) via a data network 614 using the network interface device 610. Examples of the data network 614 include, but are not limited to, the internet, a local area network, a wireless area network, a wired area network, a wide area network, and the like.

In some embodiments, the computing system 600 also includes the presentation device 612 depicted in FIG. 6. A presentation device 612 can include any device or group of devices suitable for providing visual, auditory, or other suitable sensory output. Non-limiting examples of the presentation device 612 include a touchscreen, a monitor, a speaker, a separate mobile computing device, etc. In some aspects, the presentation device 612 can include a remote client-computing device that communicates with the computing system 600 using one or more data networks described herein. Other aspects can omit the presentation device 612.

In some embodiments, the computing system 600 also includes one or more input devices 613. An input device can include any device or group of devices suitable for receiving visual, auditory, or other suitable input that controls or affects the operations of the processor 602. Non-limiting examples of an input device include a touchscreen, a mouse, a keyboard, a microphone, a separate mobile computing device, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A method in which one or more processing devices perform operations comprising:
   accessing an input image having a completion region to be replaced with new image content;
   receiving a guidance input that is applied to a portion of the completion region, wherein a size of a guidance input region that receives the guidance input comprises a first size equal to a second size of the completion region;
   transforming the input image into a modified image, wherein transforming the input image into the modified image comprises:
   providing the input image and the guidance input to an image completion neural network, wherein the image completion neural network is trained to generate new image content as a function of the guidance input and the input image, generating, with the image completion neural network, the new image content as a function of the guidance input and the input image, and replacing the completion region of the input image with the new image content to produce a modified image; and outputting the modified image.

2. The method of claim 1, wherein generating the new image content comprises:

matching, via the image completion neural network, a portion of the input image having one or more visual attributes corresponding to the guidance input; and applying an image-completion operation to the portion of the input image.

3. The method of claim 1, wherein the completion region is defined by a user-supplied mask input and the guidance input comprises one or more of a line sketch, a texture, an image, or a domain attribute value.

4. The method of claim 1, further comprising training the image completion neural network, wherein training the image completion neural network comprises:

receiving a training input image comprising a training completion region to be replaced with new training image content;

generating, using a guidance function, training guidance data as a function of the training input image;

providing the training input image and the training guidance data to the image completion neural network, wherein the image completion neural network is configured to receive the training guidance data as training input data;

generating, using the image completion neural network, the new training image content as a function of the training guidance data and the training input image;

replacing the training completion region with the new training image content to produce a modified training image;

providing the modified training image to one or more feedback functions;

generating, using the one or more feedback functions, one or more feedback metrics as a function of the modified training image; and updating the image completion neural network based on the one or more feedback metrics.

5. The method of claim 4, wherein the guidance function comprises one or more of a sketch detection neural network, a semantic segmentation neural network, or an Canny edge detector.

6. The method of claim 4, wherein training the image completion neural network further comprises performing a deform operation on the training input image to generate a deformed training input image, the deformed training input image being used as additional training input data for training the image completion neural network.

7. The method of claim 6, wherein the deform operation comprises one or more of warping or retargeting.

8. The method of claim 4, wherein the one or more feedback metrics comprise a guidance constraint loss and the one or more feedback functions comprise a guidance neural network identical to the guidance function, wherein the guidance neural network is trained to generate the training guidance data as a function of the training input image, wherein generating the one or more feedback metrics comprises:

applying the guidance neural network on the training completion region of the training input image to produce a training guidance data;

applying the guidance neural network on the new training image content within the modified training image to produce a output image guidance; and computing a pixel-wise distance between the training guidance data and the output image guidance to generate the guidance constraint loss.

9. The method of claim 8, wherein the one or more feedback metrics further comprise a generative adversarial net (GAN) loss and a pixel-wise loss and the one or more feedback functions further comprise a global discriminator neural network and a local discriminator neural network, wherein the global discriminator neural network and the local discriminator neural network are trained to generate the GAN loss based on the modified training image, wherein generating the one or more feedback metrics further comprises:

applying the global discriminator neural network on the modified training image; applying the local discriminator neural network on the new training image content within the modified training image;

generating a GAN loss based on the modified training image using the global discriminator neural network and the local discriminator neural network;

computing a pixel-wise distance between the training input image and the modified training image to generate the pixel-wise loss; and combining the guidance constraint loss with the GAN loss and the pixel-wise loss.

10. A system comprising:

a processing device; and a non-transitory computer-readable medium communicatively coupled to the processing device, wherein the processing device is configured to execute program code stored in the non-transitory computer-readable medium and thereby perform operations comprising:

accessing an input image having a completion region to be replaced with new image content, receiving a guidance input that is applied to a portion of the completion region, wherein a size of a guidance input region that receives the guidance input comprises a first size equal to a second size of the completion region, transforming the input image into a modified image, wherein transforming the input image into the modified image comprises:

providing the input image and the guidance input to an image completion neural network, wherein the image completion neural network is trained to generate new image content as a function of the guidance input and the input image, generating, with the image completion neural network, the new image content as a function of the guidance input and the input image, and replacing the completion region of the input image with the new image content to produce a modified image, and outputting the modified image.

11. The system of claim 10, wherein the completion region is defined by a user-supplied mask input and the guidance input comprises one or more of a line sketch, a texture, an image, or a domain attribute value.

12. The system of claim 10, the operations further comprising training the image completion neural network, wherein training the image completion neural network comprises:
receiving a training input image comprising a training completion region to be replaced with new training image content;
generating, using a guidance function, training guidance data as a function of the training input image;
providing the training input image and the training guidance data to the image completion neural network, wherein the image completion neural network is configured to receive the training guidance data as training input data;
generating, using the image completion neural network, the new training image content as a function of the training guidance data and the training input image;
replacing the training completion region with the new training image content to produce a modified training image;
providing the modified training image to one or more feedback functions;
generating, using the one or more feedback functions, one or more feedback metrics as a function of the modified training image; and
updating the image completion neural network based on the one or more feedback metrics.

13. The system of claim 12, wherein the guidance function comprises one or more of a sketch detection neural network, a semantic segmentation neural network, or an Canny edge detector.

14. The system of claim 12, wherein training the image completion neural network further comprises performing a deform operation on the training input image to generate a deformed training input image, the deformed training input image being used as additional training input data for training the image completion neural network.

15. The system of claim 12, wherein the one or more feedback metrics comprise a guidance constraint loss and the one or more feedback functions comprise a guidance neural network identical to the guidance function, wherein the guidance neural network is trained to generate the training guidance data as a function of the training input image, wherein generating the one or more feedback metrics comprises:
applying the guidance neural network on the training completion region of the training input image to produce a training guidance data;
applying the guidance neural network on the new training image content within the modified training image to produce a output image guidance; and
computing a pixel-wise distance between the training guidance data and the output image guidance to generate the guidance constraint loss.

16. The system of claim 15, wherein the one or more feedback metrics further comprise a generative adversarial net (GAN) loss and a pixel-wise loss and the one or more feedback functions further comprise a global discriminator neural network and a local discriminator neural network, wherein the global discriminator neural network and the local discriminator neural network are trained to generate the GAN loss based on the modified training image, wherein generating the one or more feedback metrics further comprises:
applying the global discriminator neural network on the modified training image; applying the local discriminator neural network on the new training image content within the modified training image;
generating a GAN loss based on the modified training image using the global discriminator neural network and the local discriminator neural network;
computing a pixel-wise distance between the training input image and the modified training image to generate the pixel-wise loss; and
combining the guidance constraint loss with the GAN loss and the pixel-wise loss.

17. A non-transitory computer-readable medium having program code that is stored thereon, the program code executable by one or more processing devices for performing operations comprising:
accessing an input image having a completion region to be replaced with new image content;
receiving a guidance input that is applied to a portion of the completion region, wherein a size of a guidance input region that receives the guidance input comprises a first size equal to a second size of the completion region;
transforming the input image into a modified image, wherein transforming the input image into the modified image comprises:
providing the input image and the guidance input to an image completion neural network, wherein the image completion neural network is trained to generate new image content as a function of the guidance input and the input image,
generating, with the image completion neural network, the new image content as a function of the guidance input and the input image, and
replacing the completion region of the input image with the new image content to produce a modified image; and
outputting the modified image.

18. The non-transitory computer-readable medium of claim 17, the operations further comprising training the image completion neural network, wherein training the image completion neural network comprises:
receiving a training input image comprising a training completion region to be replaced with new training image content;
generating, using a guidance function, training guidance data as a function of the training input image;
providing the training input image and the training guidance data to the image completion neural network, wherein the image completion neural network is configured to receive the training guidance data as training input data;
generating, using the image completion neural network, the new training image content as a function of the training guidance data and the training input image;
replacing the training completion region with the new training image content to produce a modified training image;
providing the modified training image to one or more feedback functions;
generating, using the one or more feedback functions, one or more feedback metrics as a function of the modified training image; and
updating the image completion neural network based on the one or more feedback metrics.

19. The non-transitory computer-readable medium of claim 18, wherein training the image completion neural network further comprises performing a deform operation on the training input image to generate a deformed training input image, the deformed training input image being used as additional training input data for training the image completion neural network.

20. The non-transitory computer-readable medium of claim 18, wherein the one or more feedback metrics comprise a guidance constraint loss and the one or more feedback functions comprise a guidance neural network identical to the guidance function, wherein the guidance neural network is trained to generate the training guidance data as a function of the training input image, wherein generating the one or more feedback metrics comprises:

applying the guidance neural network on the training completion region of the training input image to produce a training guidance data;

applying the guidance neural network on the new training image content within the modified training image to produce a output image guidance; and computing a pixel-wise distance between the training guidance data and the output image guidance to generate the guidance constraint loss.

\* \* \* \* \*